(12) United States Patent
Auer et al.

(10) Patent No.: US 10,093,201 B2
(45) Date of Patent: Oct. 9, 2018

(54) ADJUSTER WITH STORAGE FUNCTION OF A VEHICLE SEAT BACKREST

(71) Applicant: Magna Seating (Germany) GmbH, Sailauf (DE)

(72) Inventors: Florian Auer, München (DE); Christoph Brehm, Münster (DE); David Preisser, Fürth (DE); Andreas Wachtel, Lohr (DE); Bernd Efler, Waldems (DE)

(73) Assignee: MAGNA Seating (Germany) GmbH, Sailauf (DE)

( * ) Notice: Subject to any disclaimer, the term of this patent is extended or adjusted under 35 U.S.C. 154(b) by 7 days.

(21) Appl. No.: 15/614,673

(22) Filed: Jun. 6, 2017

(65) Prior Publication Data
US 2017/0349064 A1 Dec. 7, 2017

(30) Foreign Application Priority Data

Jun. 6, 2016 (DE) .................. 10 2016 209 917

(51) Int. Cl.
*B60N 2/235* (2006.01)
*B60N 2/68* (2006.01)

(52) U.S. Cl.
CPC .......... *B60N 2/2356* (2013.01); *B60N 2/236* (2015.04); *B60N 2/2358* (2013.01); *B60N 2/682* (2013.01); *B60N 2/235* (2013.01); *B60N 2002/684* (2013.01)

(58) Field of Classification Search
CPC .... B60N 2/2356; B60N 2/236; B60N 2/2358; B60N 2/682; B60N 2/235; B60N 2002/684
See application file for complete search history.

(56) References Cited

U.S. PATENT DOCUMENTS

| | | | | |
|---|---|---|---|---|
| 5,685,610 A * | 11/1997 | Minai | ................. | B60N 2/2218 297/364 |
| 5,769,494 A * | 6/1998 | Barrere | ................ | B60N 2/2358 297/367 R |
| 6,082,821 A * | 7/2000 | Baloche | .............. | B60N 2/2358 297/354.12 |
| 6,619,744 B2 * | 9/2003 | Reubeuze | ............ | B60N 2/2358 297/367 R |
| 8,366,197 B2 * | 2/2013 | Aktas | ................... | B60N 2/2218 297/367 R |
| 8,641,145 B2 * | 2/2014 | Schwarze | .............. | B60N 2/206 297/366 |
| 8,864,234 B2 * | 10/2014 | McCulloch | ......... | B60N 2/2358 297/367 P |
| 9,056,565 B2 * | 6/2015 | Otto | ..................... | B60N 2/2362 |
| 9,623,774 B2 * | 4/2017 | Yamada | ............... | B60N 2/2227 |
| 2008/0148517 A1 * | 6/2008 | Rosato | ................ | B60N 2/2356 16/257 |
| 2012/0119555 A1 * | 5/2012 | Aktas | ................... | B60N 2/2218 297/366 |
| 2015/0321585 A1 * | 11/2015 | McCulloch | ......... | B60N 2/2358 297/367 P |
| 2017/0349064 A1 * | 12/2017 | Auer | .................... | B60N 2/2356 |

* cited by examiner

*Primary Examiner* — Philip F Gabler
(74) *Attorney, Agent, or Firm* — Jordan IP Law, LLC; Todd A. Vaughn

(57) ABSTRACT

A vehicle seat adjuster for adjusting the inclination of a backrest with respect to the seat.

12 Claims, 2 Drawing Sheets

ADJUSTER WITH STORAGE FUNCTION OF A VEHICLE SEAT BACKREST

CROSS-REFERENCE TO RELATED APPLICATIONS

The present application claims priority under 35 U.S.C. § 119 to German Patent Application No. 10 2016 099 17.5 (filed on Jun. 6, 2016), which is hereby incorporated by reference in its entirety.

TECHNICAL FIELD

Embodiments relate to a vehicle seat adjuster configured to adjust an inclination of a backrest about a central axis with respect to a seat cushion of a seat with a memory function.

BACKGROUND

Seat backrest adjusters may be constructed in a motorised or manual manner. Manual seat backrest adjustment mechanisms and easy-entry seat release mechanisms are known. An example of a combined seat backrest adjustment device/easy-entry mechanism of the disc type is described in U.S. Pat. No. 7,677,665.

There is provided an adjustment device for a vehicle seat which contains a lower seat portion and a seat backrest which can be adjusted in order to change the angle of inclination of the seat backrest relative to the lower seat portion. The seat backrest can also be released so that the seat backrest can be folded forwards in order to afford comfortable access to seats or storage spaces which are located behind the vehicle seat. A first group of one or more adjustment mechanism(s) may be adjusted about a rotation or pivot axis in order to retain the seat backrest selectively at a selected angle within a range of inclination angles. Another group of one or more mechanism(s) connect(s) one of the first group of seat adjustment devices to the seat backrest and is fitted coaxially to the first seat adjustment device.

Another adjuster for adjusting an inclination of the backrest of a vehicle seat is known from EP 2 326 531 B1.

In DE 112012004173 T5, the second group contains at least one so-called "easy-entry" mechanism which can be adjusted in order to pivot the seat backrest about the pivot axle between the selected inclination angle thereof and a position which is folded forwards, which affords access to the region behind the seat.

In this instance, a continuous seat adjustment mechanism and a discontinuous easy-entry mechanism are coaxially connected and fitted to the pivot axle of the seat backrest in such a manner that the continuous mechanism can be actuated in order to adjust the comfort of the seat backrest and the discontinuous mechanism can be actuated in order to fold the seat backrest forwards for comfortable entry (easy entry), if desired.

This solution leads to the driver obtaining his desired inclination position again after the easy-entry. It is not possible, however, to store an inclination position when the adjuster is adjusted manually.

SUMMARY

Embodiments relate to an adjuster with a storage function for the inclination of a vehicle seat backrest, by which it is possible to find an adjusted inclination again after any adjustment of the backrest. In contrast to storage when the folding function is used, the stored position is to be approached from two directions.

The "zero position" is intended to be understood to be the position in which the claws guided by the control pins in the recesses of the control plate is located in the radial position in which the claws are in engagement with the toothed plate via the tooth arrangement thereof.

In accordance with embodiments, the adjuster may have a guide plate which is connected to the seat cushion or the backrest, and a toothed plate which is connected to the backrest or the seat cushion. The toothed plate has a first tooth arrangement which is arranged on a radial peripheral face, and a second tooth arrangement which is arranged on an end face.

A plurality of claws are provided which have a tooth arrangement, and which are adjustably supported in the guide plate between a first position, in which the number of claws are in engagement with the first tooth arrangement of the toothed plate, and a second position, in which the engagement between the first tooth arrangement and the number of claws is released and a rotation is possible between the guide plate and toothed plate. A shaft is provided which is arranged coaxially relative to the central axis, the shaft having a first rotation direction and a second rotation direction.

A displacement element is provided and which is supported on the shaft so as to be displaced in the direction of the central axis. The displacement element includes a control contour having a recess.

A control plate is provided to have at least one control contour configured to adjust the number of claws between the first position and the second position. The control plate has a contour via which in a first position a rotationally secure connection can be produced between the control plate, the displacement element and the shaft in the position for use of the vehicle seat.

The control plate further has a contour which, when a memory position is detected, cooperates with the control contour of the displacement element. When the memory position is reached, in a second position the rotationally secure connection between the control plate and guide plate is cancelled.

A storage plate is arranged to be rotated about the central axis, and is displaceable along the central axis. In a first position, the storage plate is in engagement via a tooth arrangement with the second tooth arrangement of the toothed plate. In a second position, the storage plate is out of engagement with the toothed plate. The storage plate has a control contour configured such that, when the memory position is reached, is to displace the displacement element out of the position for use along the central axis A.

DRAWINGS

Embodiments will be illustrated by way of example in the drawings and explained in the description below.

FIG. 1a is a rotated perspective view of the storage plate of the adjuster of FIG. 1.

DESCRIPTION

Figure 1:
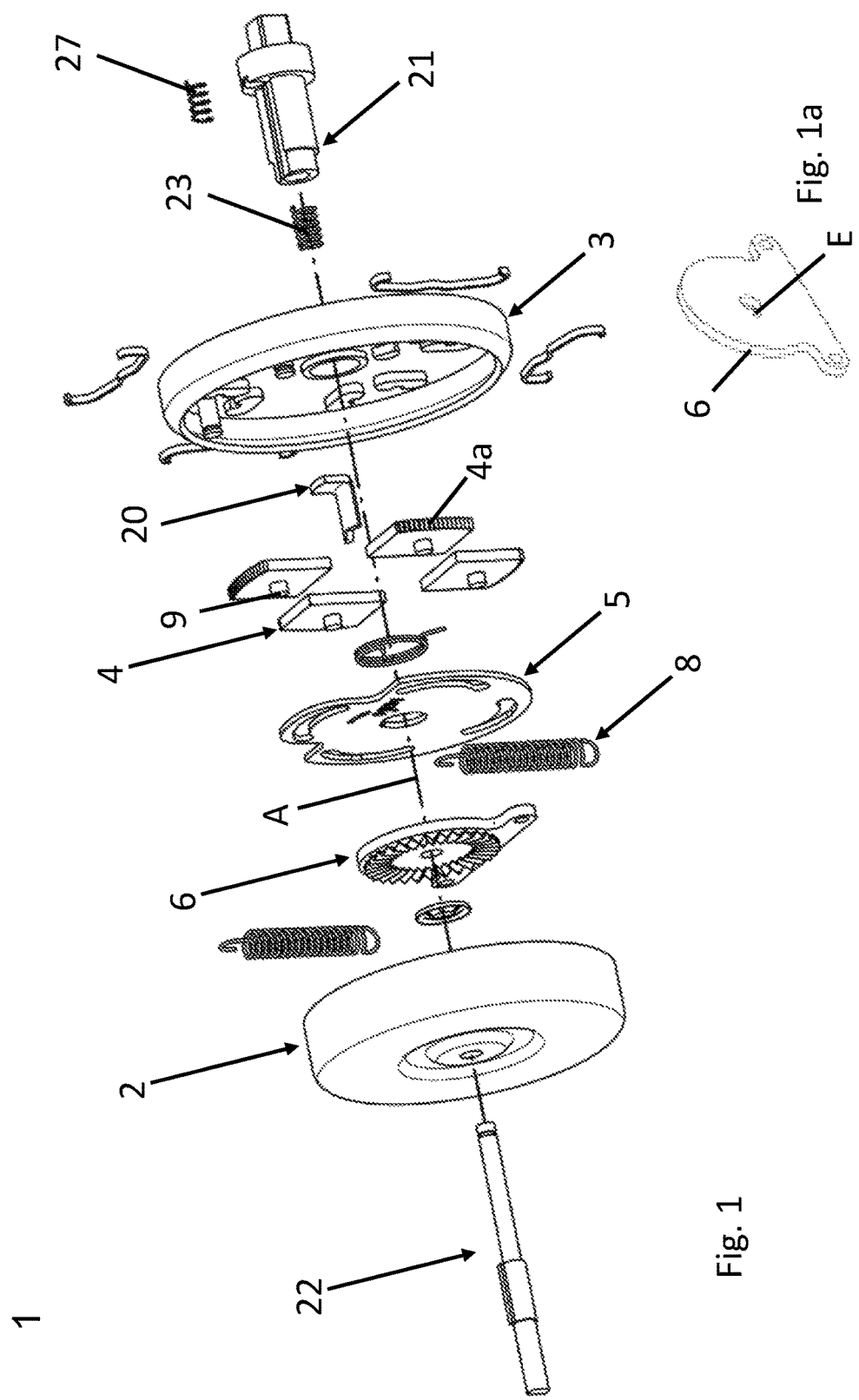
FIG. 1 is an exploded view of an adjuster for adjustment of a backrest inclination, in accordance with embodiments.

FIG. 1 is an exploded view of an adjuster 1 with the significant structural elements. The levers and pulling members which are required for the movements, locking actions, etcetera, are not illustrated in the drawings.

The adjuster 1 serves to adjust an inclination of a backrest of a vehicle seat, in which the backrest is pivotably connected to a seat cushion. The adjuster 1 has a central axis A about which the backrest can be pivoted. At the central axis A is provided a shaft 21 and an axle pin 22. The axle pin 22 is retained in a central hole of the shaft 21 via a first resilient element 23 (e.g., a spring) in a resiliently preloaded manner. The shaft 21 is arranged to have an adjustment lever which (not illustrated) to adjust the backrest inclination and for calling up and storing a memory position.

Figure 2:
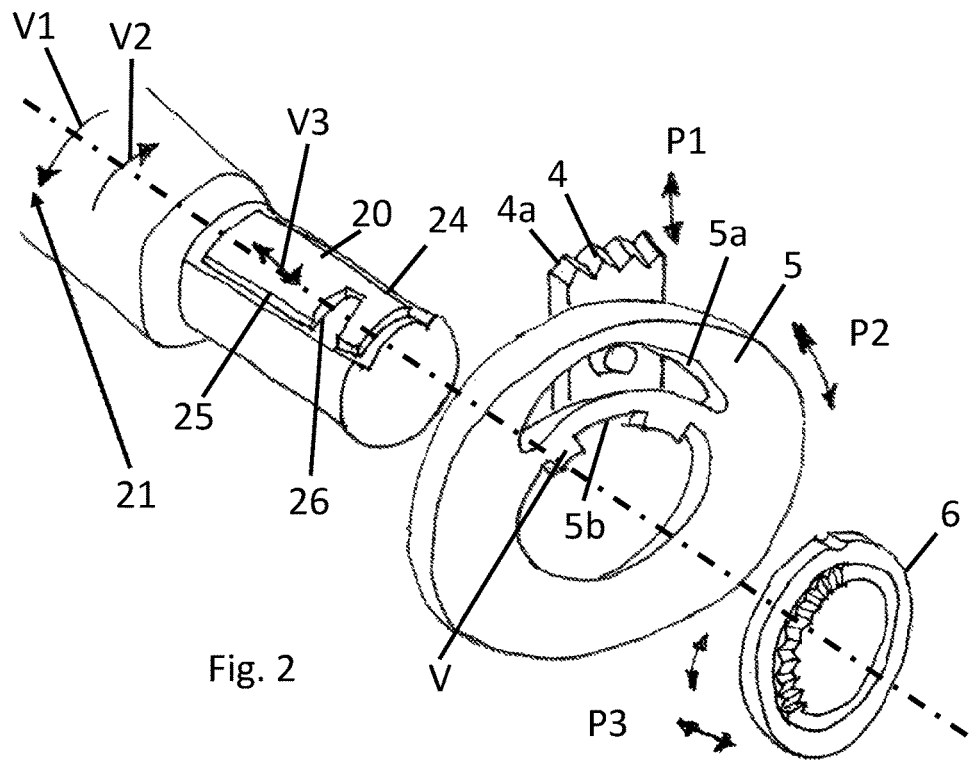
FIG. 2 is an exploded illustration of an adjuster, in accordance with embodiments.
Figure 3:
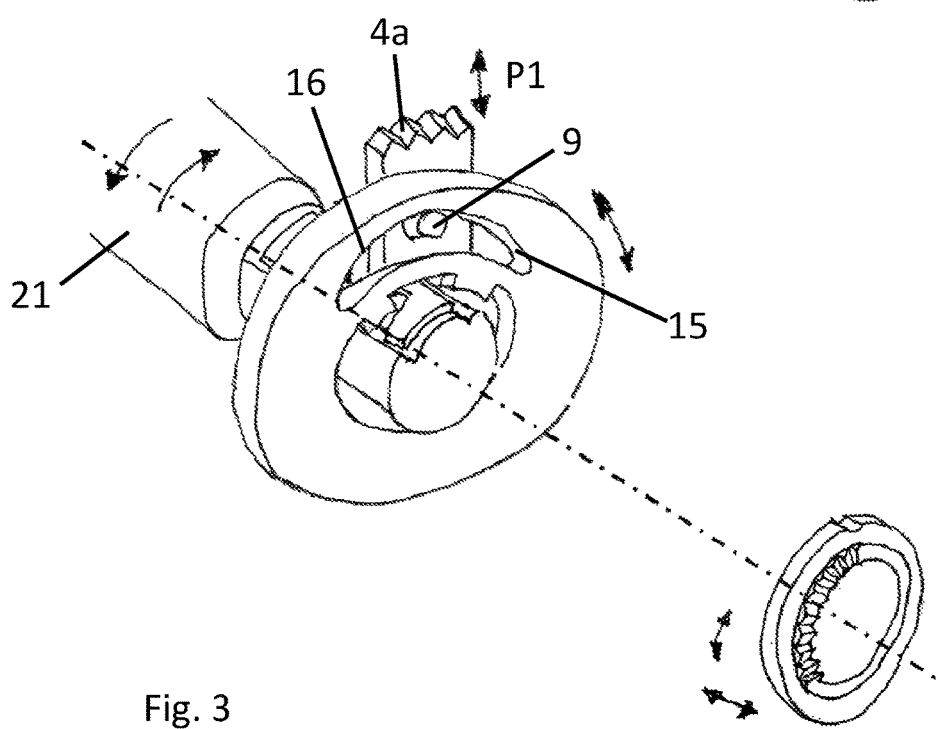
FIG. 3 is a perspective illustration of the adjuster of FIG. 2, in which the adjuster is in a position in which there is no positive-locking connection between the shaft and control plate.

FIGS. 2 and 3 respectively illustrate the rotational movement of the shaft 21 by the arrows V1 and V2. A displacement element 20 is arranged on the shaft 21 to be displaceably supported in the direction along the central axis A. The displacement element 20 is fixed in the position in a resiliently pre-tensioned manner via a second resilient element 27 (e.g., a spring). The displacement movement is illustrated by the arrow V3. The displacement element 20 has a first side face 24 and a second side face 25 which extend parallel with respect to each other. The second side face 25 is constructed with a control contour, which may be constructed as a groove 26.

The adjuster 1 further includes a guide plate 3 which is connected to the structure of the seat cushion and which is arranged on the shaft 21. A toothed plate 2 is located at the opposite side in a state connected or welded to the backrest of the vehicle seat. The toothed plate 2 has a first tooth arrangement (not illustrated) on the inwardly facing radial peripheral face thereof, and a second tooth arrangement (not illustrated) which is arranged in an axial direction thereof. Between the guide plate 3 and the toothed plate 2, a control plate 5 and a storage plate 6 are further arranged on the central axis.

The adjuster 1 also includes a plurality of claws 4. As illustrated, there are provided four claws 4 which are supported in a state distributed in a uniform manner so as to be radially displaced in corresponding guides of the guide plate 3 (illustrated by the double-headed arrow P1). The control plate 5 and claws 4 extend within the periphery of the guide plate 3.

For each claw 4, the control plate 5 has an associated recess 5a in the contours of which a first control region 15 and a second control region 16 are formed. The first control region 15 and the second control region 16 are constructed in a symmetrical manner, and control the radial displacement of the claws 4. The control plate 5 has a dual function; it controls the engagement of the claws 4 via the control contours 5a and serves to call up the memory function. The control plate 5 further has a radial hole and a groove 5b for producing a tongue and groove connection between the shaft 21, the displacement element 20 and the control plate 5. In the position for use of the vehicle seat, the control plate 5 is retained in a rotationally secure manner on the shaft 21 via the displacement element 20. The claws 4 are constructed as plate-like segments and also have a control contour.

The control contour cooperates with the first control region 15 and the second control region 16 of the control plate 5. In the embodiment, the control contour is constructed as a control pin 9. Furthermore, the claws 4 are constructed at the radially outwardly facing edges thereof to have a tooth arrangement 4a. Via the tooth arrangement 4a, in the position for use of the seat or the backrest, the claws 4 are in engagement with the first tooth arrangement of the toothed plate 2.

The storage plate 6 is rotatably supported on the axle 22 of the adjuster 1 between the toothed plate 2 and the guide plate 3 and has a spur tooth arrangement. Via the spur tooth arrangement, the storage plate 6 is in engagement with the second tooth arrangement of the toothed plate 2 in the position for use. The tooth arrangement is, for example, constructed as a Hirth tooth arrangement. Furthermore, the storage plate 6 is arranged to be adjusted along the central axis A. The storage plate 6 has a control contour which is constructed in the embodiment as a protuberance E and which is arranged on the side face facing the displacement element 20. In the position for use of the seat, the protuberance E is arranged with spacing with respect to the displacement element 20. The storage plate 6 is connected to the guide plate 3 via two resilient elements 8. As a result of the arrangement of the resilient elements 8, the storage plate 6 after a rotation with respect to the guide plate 3 can be returned to a starting position again by the resilient pre-tensioning.

For the adjustment of an inclination of the backrest, the tooth engagement between the tooth arrangement of the toothed plate 2 and the tooth arrangement of the claw 4 has to be opened. This is carried out by the shaft 21 being rotated via an adjustment lever which is not illustrated in the direction of the arrow V1. As a result of the arrangement of the control plate on the displacement element in a tongue and groove connection, the control plate 5 is accordingly also rotated and the claws 4 are pulled radially inwards via the control pins 9 and the engagement thereof on the first control region 15 and the second control region 16.

The storage plate 6 is also rotated when the backrest is adjusted since the toothed plate 2 is securely connected to the backrest, for example, welded.

After the adjustment of the backrest inclination, the adjuster is secured again by a resilient force when the adjustment is released bringing the control plate 5 into the original position ("zero position") and consequently the claws 4 moving into engagement with the tooted plate again. The storage plate 6 is now located in a position rotated with respect to the starting position and the resilient elements 8 are under tension.

When a new memory position is adjusted, the storage plate 6 is moved via a displacement along the central axis A out of engagement with the second tooth arrangement of the toothed plate 2. Between the storage plate 6 and the guide plate 3 there are arranged resilient elements 8 which aligns the storage plate 6 with respect to the guide plate 3 after the storage plate 6 has been released from the toothed plate 2. Subsequently, the storage plate is moved into engagement with the toothed plate again.

In order to call up the memory position, the shaft 21 is to be rotated in the direction of the arrow V1. During the rotation movement, the control plate 5 which rests on the displacement element 5 also rotates. The claws 4 are thereby pulled radially inwards as a result of the control contour, and the claws 4 are released from the tooth engagement of the toothed plate. The backrest is thereby released from the seat cushion and can be adjusted. When the backrest is rotated with respect to the seat cushion, when the memory position is reached, the protuberance E of the storage plate 6 then comes into contact with a contour of the displacement element 20. The displacement element 20 is thereby displaced on the shaft 21 along the arrow V3. During the displacement movement, the control plate 5 is displaced via the groove 5b on the side face 25 and the control contour and a projection V of the control plate delimiting the groove 5b is engaged in the groove 26. In this position illustrated in FIG. 3, there is no rotationally secure connection between the control plate 5 and the shaft 21 and the adjuster is blocked.

The rotationally secure connection for calling up the memory position is reproduced via the return of the displacement element by the spring 27. The control plate 5 remains in the axial position thereof; the displacement element 20 is axially displaced along the guide thereof in the shaft 21. The control plate 5 is displaced via a resilient force into the original position ("zero position") and the claws 4 lock the adjuster.

When the backrest is adjusted into the pre-adjusted "memory position" thereof, the user has to detect the pre-adjusted inclination position. To this end, the claws 4 are to be moved by rotating the control plate 5 in a clockwise direction from engagement with the tooth arrangement of the toothed plate 2. The user subsequently adjusts the backrest which is connected to the toothed plate 2 in a rotationally secure manner. When the stored position is reached, the adjuster 1 is blocked. As a result of the resistance which is thereby produced, the user identifies that the stored position has been reached and releases the control of the position interrogation. The adjuster locks by a resilient force when the adjustment is released moving the control plate into the starting position thereof ("zero position") and consequently the claws 4 moving into engagement with the toothed plate again.

In accordance with embodiments, the adjuster 1 locks immediately in a crash-secure manner when the stored position is reached. This is achieved by the claws 4 moving into engagement with the toothed plate 2 when the stored position is reached.

The term "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

What is claimed is:

1. A vehicle seat adjuster to adjust an inclination of a backrest about a central axis with respect to a seat cushion with a memory function, the vehicle seat adjuster comprising:
   a guide plate for connection to the seat cushion or the backrest;
   a toothed plate for connection to the backrest or the seat cushion;
   a plurality of claws having a tooth arrangement, the claws being adjustably supported in the guide plate for movement between a first position, in which the claws are in engagement with the toothed plate, and a second position, in which the engagement between the claws and the toothed plate is released to permit rotation between the guide plate and toothed plate;
   a shaft arranged coaxially relative to the central axis, the shaft having a first rotation direction and a second rotation direction;
   a displacement element supported on the shaft for displacement along the central axis, the displacement element including a displacement element control contour;
   a control plate having at least one control contour configured to adjust the claws between the first position and the second position, the control plate having a first control plate contour via which in a first control plate position, a rotationally secure connection is to be produced between the control plate, the displacement element, and the shaft, the control plate having a second control plate contour which, when a memory position is detected, is to cooperate with the displacement element control contour and, when the memory position is reached, in a second control plate position, the rotationally secure connection between the control plate and guide plate is released; and
   a storage plate arranged for rotation about the central axis, and displacement along the central axis such that in a first storage plate position, the storage plate is in engagement via a tooth arrangement with the toothed plate, and, in a second storage plate position, is out of engagement with the toothed plate, the storage plate having a storage plate control contour arranged such that when the memory position is reached, is to displace the displacement element.

2. The vehicle seat adjuster of claim 1, further comprising:
   an axle pin arranged on the central axis; and
   a resilient element configured to retain the axle pin in an axially displaceable manner in a central hole of the shaft in a resiliently pre-tensioned state.

3. The vehicle seat adjuster of claim 1, further comprising a second resilient element configured to retain the displacement element on the shaft in a resiliently pre-tensioned manner.

4. The vehicle seat adjuster of claim 1, wherein the displacement element has a first side face and a second side face which respectively extend in an axial direction parallel with each other.

5. The vehicle seat adjuster of claim 4, wherein the second side face defines a groove.

6. The vehicle seat adjuster of claim 1, wherein for each claw, the control plate has an associated recess of which a first control region and a second control region are formed.

7. The vehicle seat adjuster of claim 6, wherein the first control region and the second control region are constructed in a symmetrical manner so as to control a radial displacement of the claws.

8. The vehicle seat adjuster of claim 1, wherein the contour of the control plate comprises a radial hole and a groove to produce a tongue and groove connection between the shaft, the displacement element, and the control plate.

9. The vehicle seat adjuster of claim 8, wherein a radially inwardly facing projection of the control plate delimits the groove.

10. The vehicle seat adjuster of claim 1, further comprising a first resilient element and a second resilient element configured to connect the storage plate to the guide plate.

11. The vehicle seat adjuster of claim 10, wherein the storage plate is connected to the guide plate in such manner that the storage plate, after a rotation with respect to the guide plate, and after release of engagement between the storage plate and toothed plate, is returned again via a resilient pre-tensioning to a starting position with respect to the guide plate.

12. A vehicle seat adjuster to adjust an inclination of a backrest with respect to a seat cushion, the vehicle seat adjuster comprising:
- a guide plate for connection to the seat cushion or the backrest;
- a toothed plate for connection to the backrest or the seat cushion;
- a plurality of claws adjustably supported in the guide plate for movement between a first position in which the claws engage the toothed plate, and a second position in which the engagement between the claws and the toothed plate is released to permit rotation between the guide plate and toothed plate;
- a displacement element configured for displacement along a central axis;
- a control plate configured to adjust the claws between the first position and the second position, wherein the control plate is to cooperate with the displacement element when a memory position is detected, the control plate being moveable between a first control plate position in which a rotationally secure connection is produced between the control plate and the displacement element, and a second control plate position, when the memory position is reached, in which the rotationally secure connection between the control plate and guide plate is released; and
- a storage plate arranged for rotation about the central axis, and displacement along the central axis between a first storage plate position in which the storage plate is in engagement with the toothed plate, and a second storage plate position in which the storage plate is out of engagement with the toothed plate, wherein the storage plate is to displace the displacement element when the memory position is reached.

* * * * *